No. 727,208. PATENTED MAY 5, 1903.
C. H. SAWYER.
WHEELED SCRAPER.
APPLICATION FILED FEB. 2, 1903.
NO MODEL. 6 SHEETS—SHEET 3.

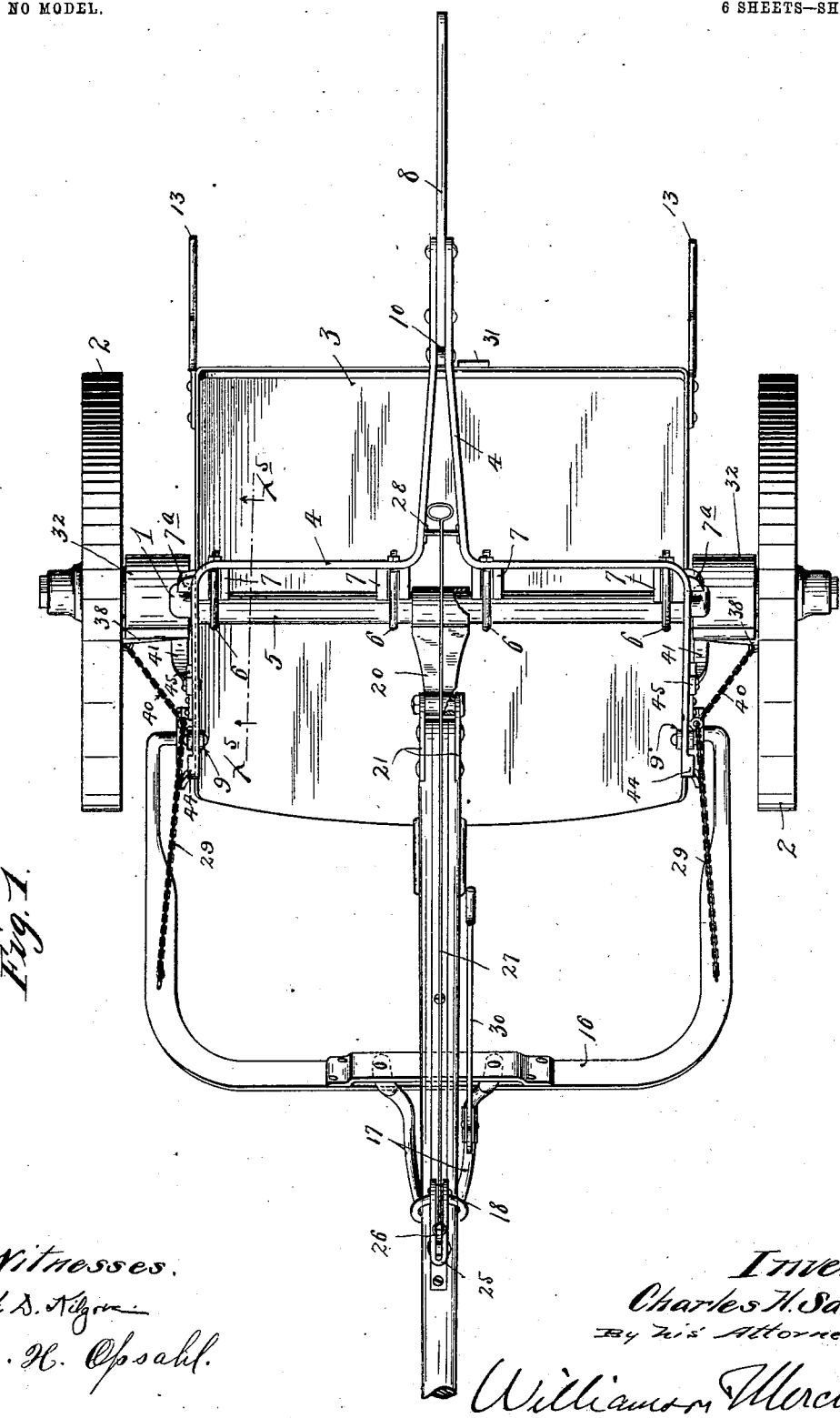

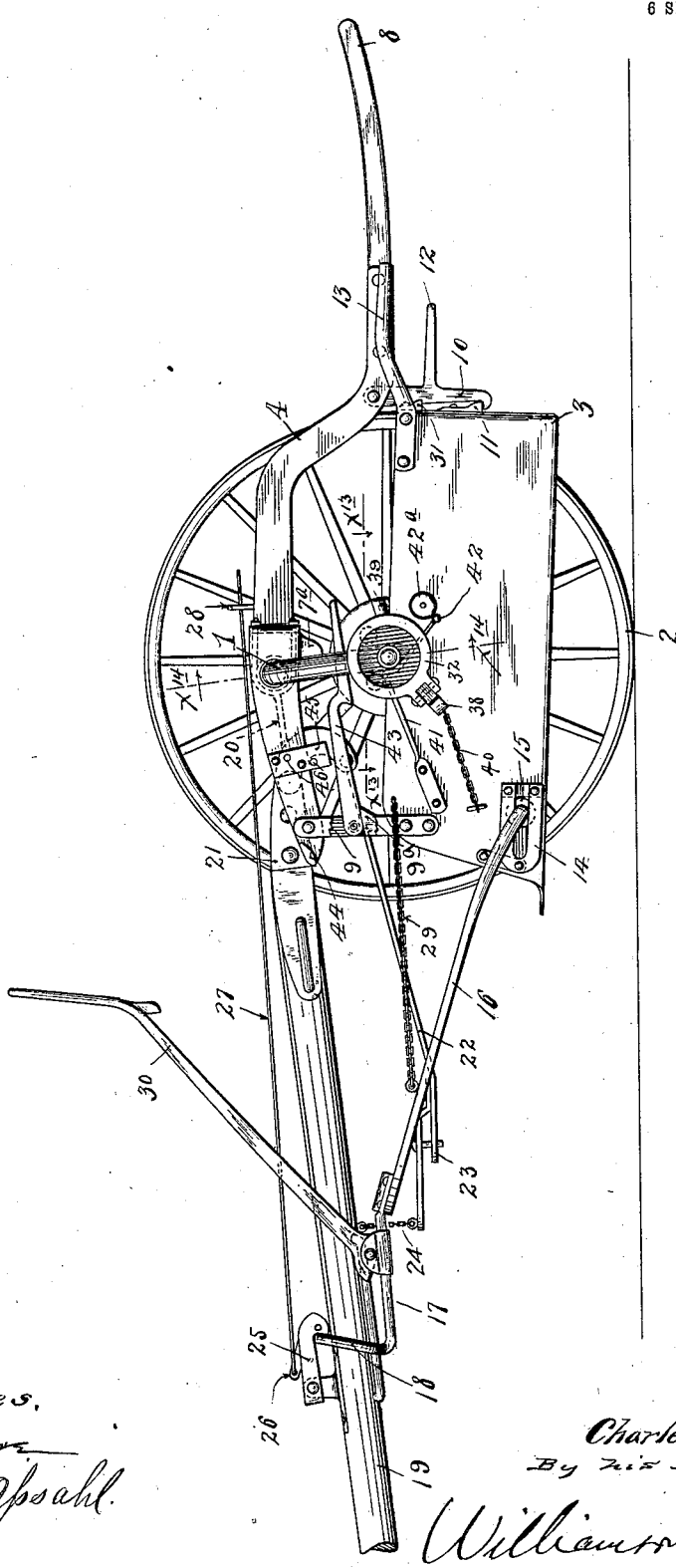

Witnesses.
H. D. Kilgore
A. H. Opsahl.

Inventor.
Charles H. Sawyer.
By his Attorneys.
Williamson Merchant

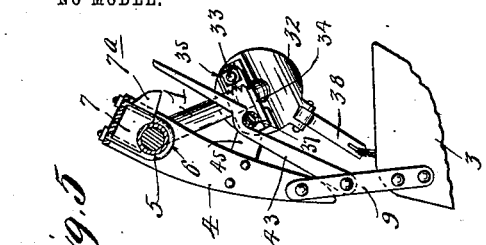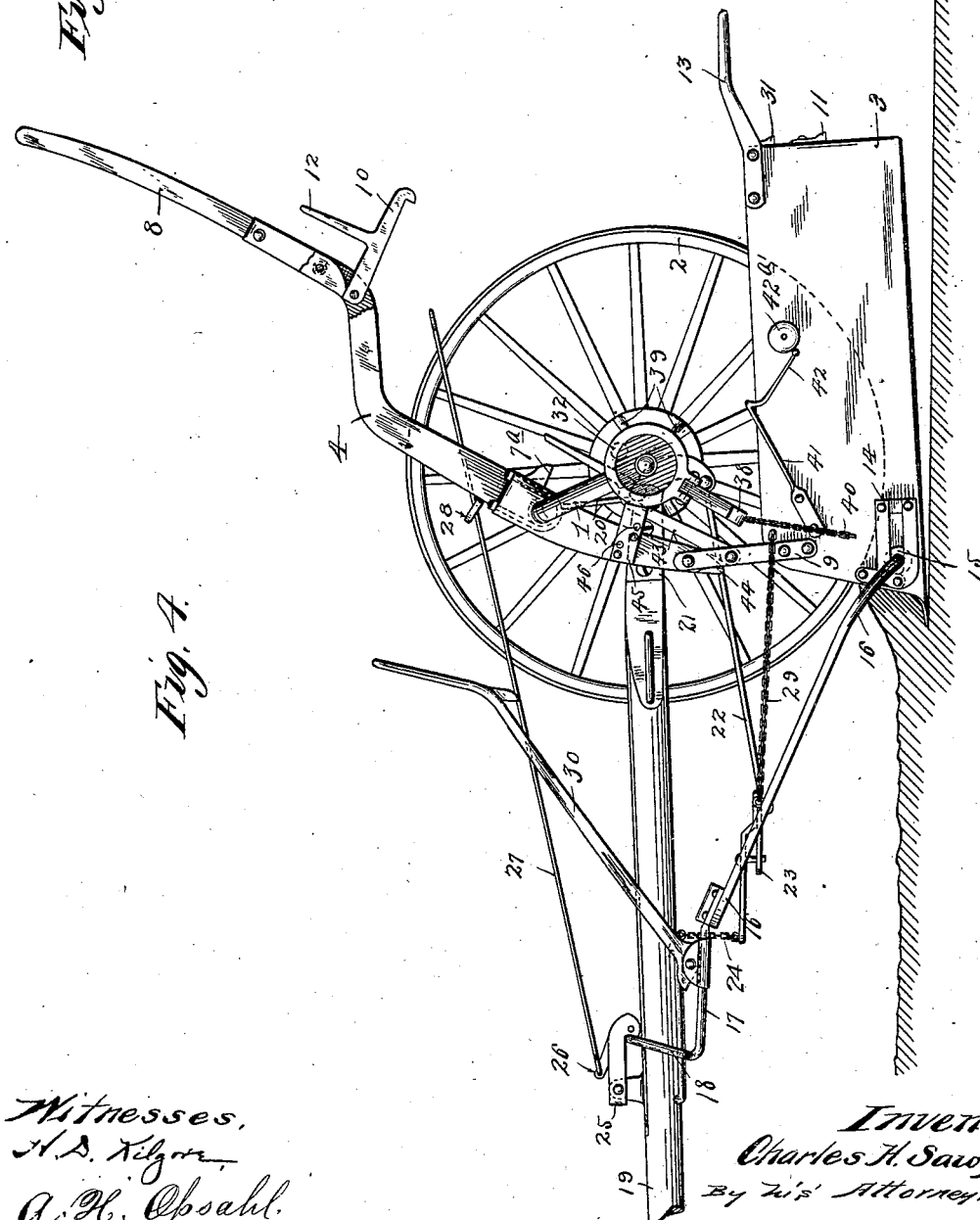

No. 727,208. PATENTED MAY 5, 1903.
C. H. SAWYER.
WHEELED SCRAPER.
APPLICATION FILED FEB. 2, 1903.
NO MODEL. 6 SHEETS—SHEET 5.

Witnesses.
H. D. Kilgore
A. H. Opsahl

Inventor,
Charles H. Sawyer
By his Attorneys.
Williamson & Merchant

No. 727,208. PATENTED MAY 5, 1903.
C. H. SAWYER.
WHEELED SCRAPER.
APPLICATION FILED FEB. 2, 1903.
NO MODEL. 6 SHEETS—SHEET 6.
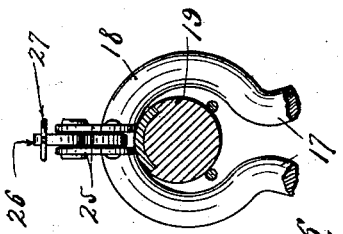

No. 727,208. Patented May 5, 1903.

UNITED STATES PATENT OFFICE.

CHARLES H. SAWYER, OF MINNEAPOLIS, MINNESOTA, ASSIGNOR OF ONE-HALF TO M. E. SAWYER, OF MINNEAPOLIS, MINNESOTA.

WHEELED SCRAPER.

SPECIFICATION forming part of Letters Patent No. 727,208, dated May 5, 1903.

Application filed February 2, 1903. Serial No. 141,405. (No model.)

*To all whom it may concern:*

Be it known that I, CHARLES H. SAWYER, a citizen of the United States, residing at Minneapolis, in the county of Hennepin and State of Minnesota, have invented certain new and useful Improvements in Wheeled Scrapers; and I do hereby declare the following to be a full, clear, and exact description of the invention, such as will enable others skilled in the art to which it appertains to make and use the same.

My present invention relates to wheeled scrapers, and has for its object to improve the same in the several particulars hereinafter set forth.

To such ends it consists of the novel devices and combinations of devices hereinafter described, and defined in the claims.

The said invention is in the nature of an improvement on the device set forth and claimed, broadly, in my prior application, Serial No. 101,292, filed April 3, 1902, and allowed October 30, 1902, entitled "Wheeled scraper."

The invention is illustrated in the accompanying drawings, wherein like characters indicate like parts throughout the several views.

Figure 5:
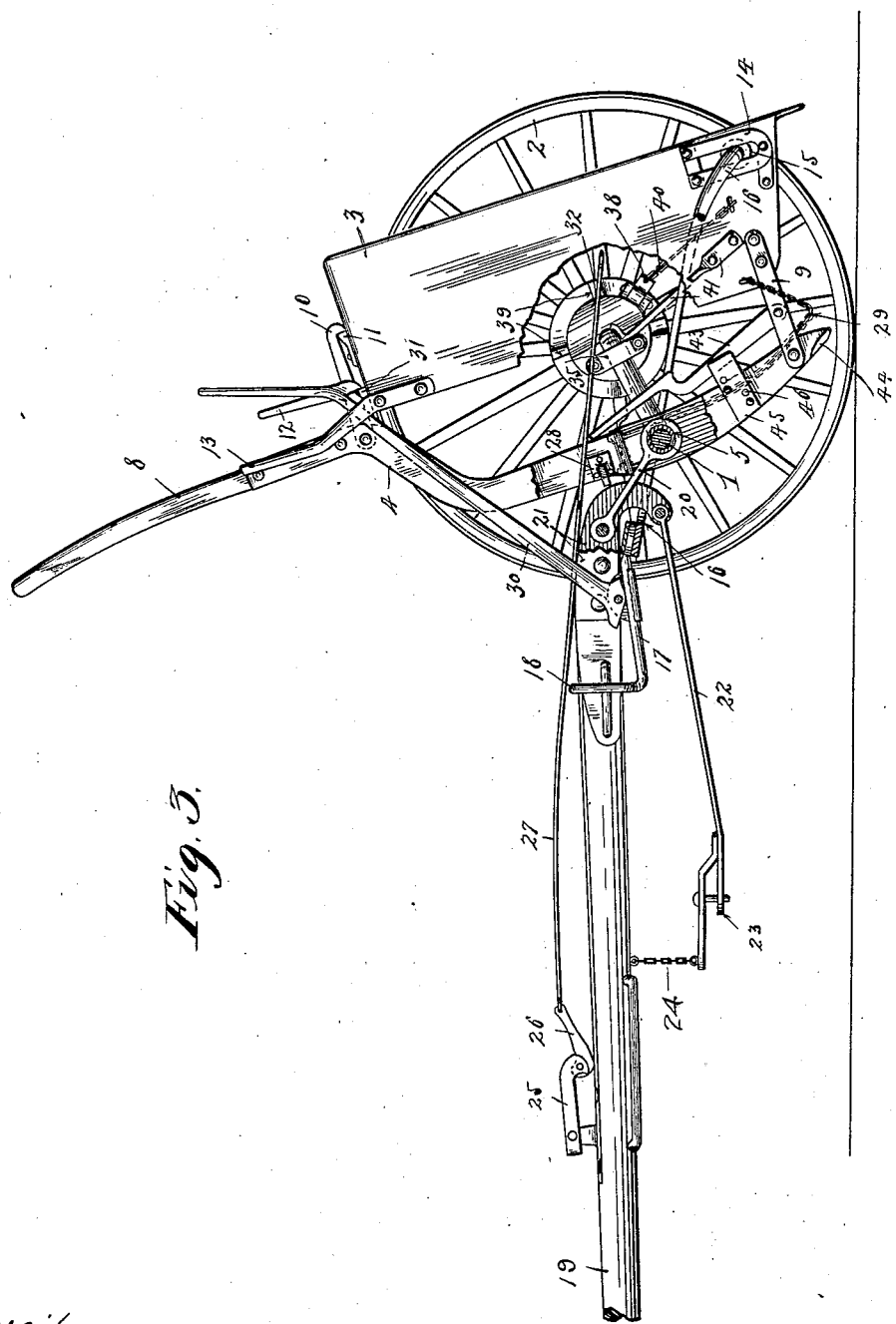
Figure 8:
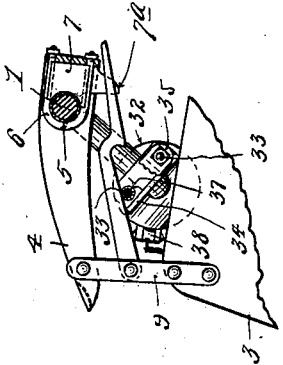
Figure 7:
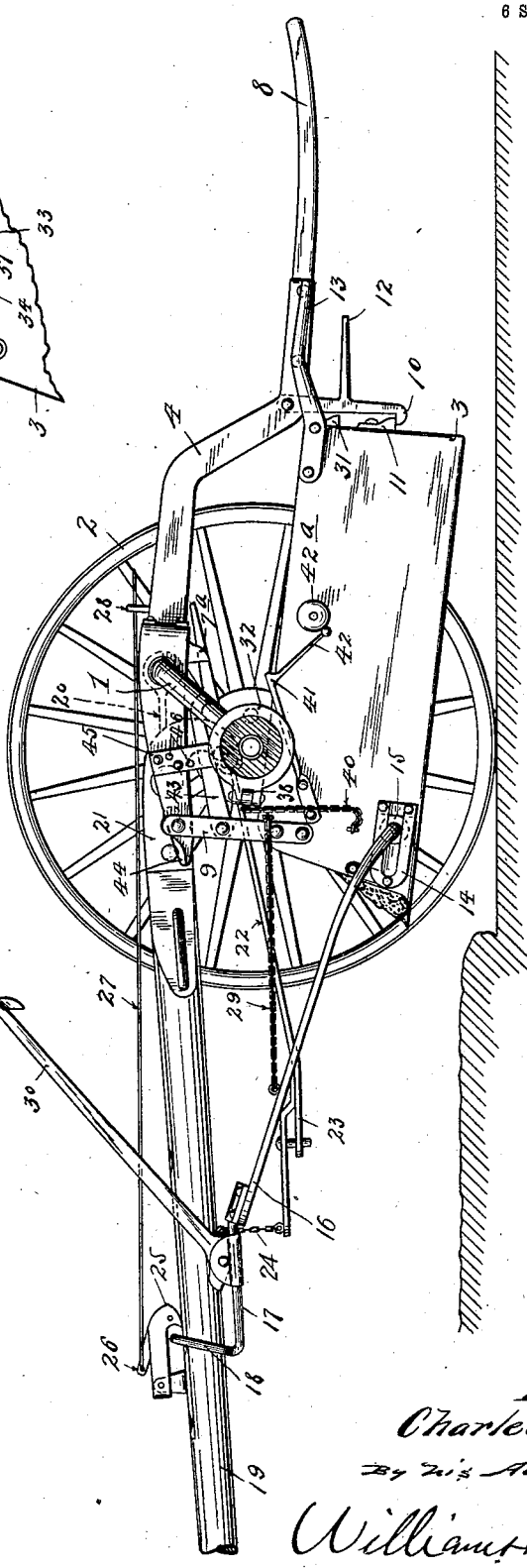
Figure 6:
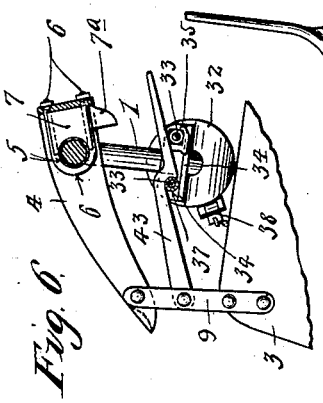

Figure 1 is a plan of the improved scraper. Fig. 2 is a left side elevation of the scraper with the left side wheel removed. Figs. 3 and 4 are similar views to Fig. 2, but with some parts broken away and with various parts shown in different positions. Fig. 5 is a detail in section on the line $x^5 x^5$ of Fig. 1, but showing the parts in the same position as in Fig. 4. Fig. 6 is a detail in section on the same line as Fig. 5, but showing the parts in different positions. Fig. 7 is a view corresponding to Figs. 2, 3, and 4, but showing the parts in still different positions. Fig. 8 is a detail corresponding to Figs. 5 and 6, but showing the parts in the same position as in Fig. 7. Fig. 9 is a detail in side elevation, showing a portion of the pole and a lock for the drag-bail. Fig. 10 is a plan view of the parts shown in Fig. 9. Fig. 11 is a transverse vertical section on the line $x^{11} x^{11}$ of Fig. 9. Fig. 12 is a view corresponding to Fig. 9, but showing the parts in different positions. Fig. 13 is a section taken approximately on the line $x^{13} x^{13}$ of Fig. 2, showing a portion of the scraper-bowl, a portion of one of the wheels, a portion of the crank-axle, and one of the clutches for connecting said crank-axle to said wheel. Fig. 14 is a detail showing substantially what is shown in Fig. 13 sectioned on the line $x^{14} x^{14}$ of Fig. 2. Fig. 15 is a section on the line $x^{15} x^{15}$ of Fig. 13. Fig. 16 is a section on the line $x^{16} x^{16}$ of Fig. 15 through the parts shown in Fig. 13, some parts being broken away; and Fig. 17 is a view, partly in plan and partly in section, showing the clutch-hub and elements for connecting the same to the crank-axle.

The numeral 1 indicates a crank-axle, upon the trunnion-like ends of which truck-wheels 2 are mounted in the usual or any suitable way.

The numeral 3 indicates the scraper-bowl, which when raised is suspended from the raised crank portion of the axle 1 by means of an oscillating lifting-lever 4. This lifting-lever 4 in plan view is of bail-like form, and at its intermediate portion it is rigidly clamped to a spacing-sleeve 5 by means of U-shaped bolts 6 and spacing-blocks 7, as best shown in Figs. 1 and 2. At the rear end of the sleeve 5 the said lifting-lever 4 is provided with a central rearwardly-projecting portion 8, which serves as a handpiece by means of which the lever may be manipulated. The sleeve 5 is loosely mounted on the swinging crank portion of the axle 1, which portion of said axle affords a fulcrum for the said lifting-lever. The prongs of the lifting-lever 4 at their forward ends are pivoted to depending links 9, the lower ends of which are riveted or otherwise rigidly secured to the forward side portions of the scraper-bowl 3. To detachably connect the rear portion of the scraper-bowl 3 to the rear portion of the lifting-lever 4, a latch-dog 10 is pivoted to the portion 8 of said lever and is adapted to engage with a lug 11 on the rear portion of said bowl. The dog 10 is shown as provided with a projecting finger 12, by means of which it may be readily released from the said lug 11. At its rear end the bowl 3 is shown as provided with hand-bars 13, secured to the sides thereof. Secured to the sides of the bowl, near its forward end, is a pair of slotted coupling-brackets 14, in which the headed rear ends 15 of a so-called "drag-bail" 16 are mounted for pivotal and for limited sliding movements.

To the forward and transversely-extended portion of the drag-bail 16 are rigidly secured the rearwardly-projecting prongs of a supplemental bail-section 17, which is formed with a loop or eye 18, that embraces and slides freely upon the pole 19. The pole 19 at its rear end is connected to the crank portion of the axle by a loose coupling-link 20, which, as shown, is loosely pivoted on the intermediate portion of the sleeve 5 and is pivoted at its forward end between laterally-spaced straps 21, rigid on the rear end of said pole. As shown, the straps 21 are curved downward, and to the depending ends thereof is pivoted the rear end of the draft-bar 22. The forward end of this draft-bar 22 is provided with a clevis 23, to which a two or three horse evener may be attached in the usual or any suitable way. Further, the forward end of said draft-bar is shown as suspended from the pole by a short chain 24.

When the parts are in the position shown in Fig. 2, the loop or eye 18 of the draft-bail is locked to the pole by a hook-like dog 25, which, as shown, is pivoted at its forward end to a lug carried by the pole and is provided at its free rear end with a pivoted releasing cam lever 26. To the free end of said lever 26 is pivoted the forward end of a trip-rod 27, the rear end of which, as shown, rests loosely on a guide 28, applied to the transverse portion of the lifting-lever 4.

Chains or flexible connections 29 connect the prongs of the drag-bail to the sides of the scraper-bowl at points above the brackets 14, as clearly shown in Figs. 1, 2, and elsewhere. On one of the prongs of the section 17 of the drag-bail is pivoted for a limited movement a long lever-like catch-pawl or "dump-latch" 30, which when the bowl and other parts are turned upward engages with a lug 31 on the rear portion of the scraper-bowl and locks the said bowl, as shown in Fig. 3, all as will be hereinafter more fully described. Rigidly secured to each side of the crank-axle and surrounding the inner portions of the hubs of the wheels is a pair of so-called "clutch-sleeves" 32. As shown, these clutch-sleeves are notched to fit the adjacent side portions of the crank-axle and are provided with pairs of studs 33, that straddle the sides of the axle and work through clamping-plates 34 and 35 and are provided at their outer ends with nuts 36. The clamping-plates 34 press against the sides of the axle, and on the said studs 33, between the said plates 34 and 35, are placed spacing-thimbles 37. (See particularly Figs. 13 and 17.) Spring-pressed clutch-dogs 38 are pivoted one to each clutch-sleeve 32, being mounted in longitudinally-extended peripheral notches or seats formed in said sleeves. Each clutch-dog 38 coöperates with clutch-teeth or driving-lugs 39, formed on the adjacent portions of the hubs of the wheels. (See Figs. 13, 15, and 16.) Again, each dog 38 is connected by a chain or flexible connection 40 to the adjacent side of the scraper-bowl, as clearly shown in Figs. 1 and 2 and elsewhere.

Applied to each side of the scraper-bowl is an axle-locking spring-latch 41. The free and rearwardly-projecting ends of these latches will engage the trunnions of the crank-axle just inward of the clutch-sleeves 32 and lock the axle and the wheels rearward, as shown in Fig. 2. One of these spring-latches 41 is provided at its free end with a projecting hammer or bell-clapper 42, which at a time hereinafter stated will strike and sound a bell 42ª, shown as secured on the left-hand side of the scraper-bowl 3.

To each link 9 of the scraper-bowl is loosely pivoted a long rearwardly-projecting gravity-actuated catch dog or hook 43, which when the parts are moved into the positions shown in Figs. 4 and 6 engage with the forward members of the spacing-thimble 37, which thimbles, it will be remembered, are rigidly secured with respect to the clutch-sleeves 32 and trunnion portions of the crank-axle. The important function performed by these catch hooks or dogs will be made clear in the description of the operation.

The outer members of the spacing-blocks 7 are shown as provided with outwardly-projecting stop-lugs 7ª, which in the position of the parts shown in Fig. 2 engage the sides of the crank-axle and limit the forward swinging movement of the crank portion of said axle, or, in other words, the rearward movement of the truck-wheels with respect to other parts of the device. The forwardly-projecting prongs of the lifting frame or lever 4 are provided with fixed stop-lugs 44 and with adjustably-secured stop-blocks 45, the latter of which, as shown, have a series of perforations, through which bolts 46 may be passed to connect the same to the prongs of said lever 4. In the positions of the parts shown in Fig. 4 the lugs 44 engage the links 9 and limit the upward movement of the lifting-lever 4. In the positions of the parts shown in Figs. 4 and 7 the stop-blocks 45 engage the peripheral portions of the clutch-sleeves 32 and limit the movement of the forward portion of the lifting-frame toward the trunnions of the crank-axle. Furthermore, in the position shown in Fig. 4 the stop-blocks 45 by their engagement with the clutch-sleeves afford a fulcrum on which the lifting-lever may be rocked in its movement downward toward the position shown in Fig. 7.

The various relations of the parts described will more fully appear in the description of the operation.

Operation: Fig. 2 illustrates the positions of the parts of the scraper for movement over the ground with a loaded bowl. In this position of the parts it will be noted that the stop-lugs 7ª and the latches 41 act upon the sides of the crank-axle to rigidly lock the said axle against movement either rearward or forward with respect to other portions of the device. At this time, it will also be noted, the chains 29 are drawn taut, while the heads 15 of the drag-bar 16 are forced rearward in the slots of the brackets 14. Again, in said position of the parts the chains 40 are drawn taut and the clutch-dogs 38 are held in inoperative positions, as shown in Fig. 16. To drop the scraper-bowl and throw the same into action, the latch-dog 10 is first released from the lug 11, and the lifting-lever 4 is then forced upward to its extreme position, as shown in Fig. 4. In the position of the parts shown in Fig. 4 the heads 15 of the drag-bail 16 are drawn forward or into engagement with the forward portions of the brackets 14, so that under the forward movement of the scraper the scraper-bowl will be drawn through the ground by the said drag-bail. Furthermore, in this position of the parts it is important to note that the clutch-tripping chains 40 are still drawn taut, so as to hold the clutch-dogs inoperative, and it is further important to note that the catch hooks or pawls 43 at this time engage with the spacing-sleeves 37, as before described and as best shown in Figs. 5 and 4. In throwing the lifting-lever 4 forward or upward and the bowl downward, as shown in Fig. 4, the wheels and the crank-axle are of necessity forced forward with respect to the pole, and to permit this relative movement the pole-coupling link 20 must be turned approximately straight upward. To lift the loaded scraper from or partially from the ground and to again connect the latch-dog 10 to the lug 11 on the rear end of the scraper-bowl, the rear end of the lifting-lever 4 must of course be again forced downward, approximately as shown in Fig. 7. In Fig. 4 the crank-axle is thrown upward of its dead-center, while in the position shown in Fig. 7 it is thrown rearward of its dead-center. It is in accomplishing this movement from the position shown in Fig. 4 into the position shown in Fig. 7 that the catch dogs or hooks 43 perform their important function—to wit, they hold the trunnions of the crank-axle, and hence the wheels, against rearward movement with respect to the pole, while the lifting-lever is being forced downward and the crank portion of the axle turned from a position forward into a position rearward of its dead-center, or a vertical position. In the position of the parts shown in Fig. 7 the chains 40 are given slack, so that the clutch-dogs 38 are thrown into engagement with certain of the clutch-teeth 39 on the hubs of the wheels. Hence as the scraper is drawn forward and the truck-wheels turned the crank-axle being at this time locked to the wheels will be moved pivotally upward and forward into the position shown in Fig. 2, wherein it will stand in a position forward of a vertical or dead-center. Under this movement of the crank-axle the wheels, the lifting-frame, and the scraper-bowl of course again move rearward with respect to the pole, so that the pole-coupling 20 is then turned into approximately a horizontal position and the chains 40 become again taut and again render the clutch-dogs 38 inoperative. As the crank-axle and other parts move from the position indicated in Fig. 7 back into the position indicated in Fig. 2 the inner portions of the axle-trunnions first engage and force downward the free ends of the spring-latches 41 and then upon reaching the position shown in Fig. 2 pass beyond the said latches, permitting them to quickly spring into locking engagement therewith. This quick movement of the left-hand latch 41 causes the hammer 42 to strike and sound the bell 42$^a$, thus automatically giving a signal that the loaded scraper is completely raised and that the scraper is then ready to be drawn away with the load.

The links 9 of the scraper-bowl are provided with shoulders 9$^a$, upon which the catch-pawls 43 rest when the parts are in the normal positions indicated in Fig. 2.

In practice two teams of horses are usually employed to draw the scraper-bowl through the ground and raise the same, and then when the load is raised and the parts of the scraper brought to the positions shown in Fig. 2 the lead team is uncoupled. The signal for uncoupling the lead team is in this way automatically given at the proper time, whereas before it has been given by the operator of the scraper and frequently not just at the proper time.

To dump the load from the scraper, the lifting-lever, together with the scraping-bowl, is turned forward into the position shown in Fig. 3; but to permit this movement the drag-bail must first be released, so that it can slide rearward of the pole. This is quickly accomplished simply by drawing on the trip-rod 27, thereby moving the lever 26 and the dog 25 into the position shown in Fig. 12, in which position said parts 25 and 26 remain until the drag-bail is again forced forward by the movement of the lifting-lever and bowl back into the positions shown in Fig. 2, under which movement the loop or eye 18 of the said drag-bail will strike the lever 26, throwing the same back to normal position, and will then pass under the nose of the dog 25 back into the normal position shown in Fig. 9.

It will of course be understood that the device is capable of modification within the scope of my invention as herein set forth and claimed.

What I claim, and desire to secure by Letters Patent of the United States, is as follows:

1. In a wheeled scraper, the combination with a crank-axle, of a lifting-lever pivoted to the crank portion of said axle, a scraper-bowl hinged to the forward portion of said lifting-lever and detachably connected to the rear portion thereof, and a catch dog or hook for locking the trunnion portions of said crank-axle in a forward position, with respect to the pole, so that the crank portion of said axle may be turned rearward of its vertical dead-center, by a downward movement of said lifting-lever, substantially as described.

2. In a wheeled scraper, the combination with a crank-axle, of a pole, a link connecting said pole to the crank portion of said axle, for a hinge-like movement, a lifting-lever also pivoted on the crank portion of said axle, a scraper-bowl hinged to the forward portion of said lifting-lever and detachably connected to the rear portion thereof, an automatic clutch, for connecting said crank-axle to one of the truck-wheels, for a limited upward and forward movement, and an automatically-actuated catch dog or hook, pivoted to a part carried by the scraper-bowl and engageable with a trunnion portion of said crank-axle, to lock the same, and the wheels, in a forward position with respect to the pole, so that the crank portion of said axle may be turned rearward of its vertical dead-center, by a downward movement of the rear end of said lifting-lever, substantially as described.

3. In a wheeled scraper, the combination with a crank-axle, of a lifting-lever pivoted to the crank portion of said axle, a scraper-bowl suspended by said lifting-lever, a pole, and a link connecting said pole to the crank portion of said axle, for a limited hinge-like movement, substantially as described.

4. The combination with a wheeled scraper, of a signal device, and automatic means for actuating the same, to indicate when certain work has been performed, as when the scraper-bowl reaches a predetermined position, substantially as described.

5. In a wheeled scraper, the combination with a crank-axle, of a scraper-bowl arranged to be raised by said crank-axle, a clutch for connecting said crank-axle to one of the truck-wheels, for a limited movement, a bell or gong, and automatic means for sounding the same, when the crank-axle has been moved so as to raise said bowl, substantially as described.

6. In a wheeled scraper, the combination with a crank-axle, of a lifting-lever pivoted on the crank portion of said axle, a clutch for connecting said crank-axle to one of the truck-wheels, for a limited movement, a scraper-bowl hinged at its forward end, to the forward end of said lifting-lever, and detachably connected, at its rear end, to the rear portion of said lifting-lever, a bell or gong on the scraper-bowl, and a spring-latch 41, provided with a hammer 42, for action on said bell, and adapted to be engaged and operated by the crank-axle, under that movement of said axle which raises said scraper-bowl to an elevated normal position, substantially as described.

7. In a wheeled scraper, the combination with a crank-axle, of a lifting-frame pivoted on the crank portion of said axle, a scraper-bowl hinged to the forward portion of said axle and detachably connected to the rear portion thereof, a stop on said lifting-lever engageable with said axle, to limit the forward swinging movements thereof, and a spring-latch on the scraper-bowl, engageable with a lower portion of said axle, to hold the wheels rearward, when the bowl is raised, substantially as described.

In testimony whereof I affix my signature in presence of two witnesses.

CHARLES H. SAWYER.

Witnesses:
ELIZABETH H. KELIHER,
F. D. MERCHANT.